United States Patent [19]
Berglund

[11] Patent Number: 5,829,242
[45] Date of Patent: Nov. 3, 1998

[54] PROCESS FOR MANUFACTURING A ROPE

[75] Inventor: Carl O. Berglund, Houston, Tex.

[73] Assignee: Teledyne Brown Engineering, a Division of Teledyne Industries Inc, Huntsville, Ala.

[21] Appl. No.: 870,878

[22] Filed: Aug. 6, 1997

[51] Int. Cl.[6] .................................................. D01H 13/26
[52] U.S. Cl. ............................... 57/295; 57/257; 57/258; 57/292; 57/297
[58] Field of Search .................................. 57/257, 258, 7, 57/292, 295, 297; 87/1

[56] References Cited

U.S. PATENT DOCUMENTS

| | | | |
|---|---|---|---|
| 2,153,963 | 4/1939 | Lejeune et al. | 57/258 |
| 2,372,868 | 4/1945 | Warren | 57/258 |
| 4,095,404 | 6/1978 | Babayan | 57/164 |
| 4,312,260 | 1/1982 | Morieras | 87/1 |
| 4,728,387 | 3/1988 | Hilakos | 57/297 |
| 5,080,175 | 1/1992 | Williams | 166/385 |
| 5,209,136 | 5/1993 | Williams | 74/502.5 |
| 5,234,058 | 8/1993 | Sas-Jaworsky et al. | 166/385 |

*Primary Examiner*—William Stryjewski
*Attorney, Agent, or Firm*—William A. Knox

[57] ABSTRACT

The modulus of stretch af a fibrous rope is reduced by impregnating a plurality of spaced-apart segments of the rope with an epoxy plastic thereby to reduce the modulus of stretch of the segment equal to zero after curing the plastic. The overall modulus of stretch of a re-manufactured rope taken as a whole is proportional to the ratio of the length of an impregnated segment relative to a unit length of the rope.

7 Claims, 1 Drawing Sheet

PROCESS FOR MANUFACTURING A ROPE

BACKGROUND OF THE INVENTION

1. Field of the Invention

This invention relates to a method for providing ropes spun from organic fibers, natural or synthetic, that have a selectively adjustable effective modulus of stretch.

2. Discussion of Relevant Art

In this disclosure, the terms "line", "cord", "hawser", "rope", and the like, are used in their ordinary dictionary meanings, generically defined as an elongated bundle of fibers twisted together. By way of convenience, but not by way of limitation, the word "rope" will be used as a collective term to be applied to all such binding materials. The modulus of stretch means the elongation, in percent, of an off-the-shelf rope as a function of rated loading expressed in terms of percentage of manufacturer's rated breaking strength. The effective modulus of stretch means the elongation as a function of percent of rated loading of a rope re-manufactured according to the process of this invention. This disclosure applies only to ropes spun from natural or synthetic organic fibers.

Ropes are used for many purposes. For some applications such as for bungee jumping and aircraft glider towing, resiliency or stretch of the rope is a desirable attribute. In other applications such as for use as guy lines for anchoring deep-water offshore oil rigs or for use as stress members in a towed seismic hydrophone cable, rope stretch is an unwanted evil.

As an example, which should not be taken as a limitation, a seismic streamer cable is towed by a ship through the water along a line of survey in marine seismic exploration. The streamer cable includes many hundreds or thousands of acoustic sensors such as hydrophones that are carefully spaced apart at some preferred interval such as 25 meters. The hydrophones are mounted in an elongated neutrally-buoyant sectionalized plastic hose that may be 5 kilometers or more long. An acoustic source visits selected survey stations within the survey area located along the line of survey at stations spaced-apart by a selected multiple of the hydrophone spacing. Periodically, the source insonifies the subsurface so that the hydrophones can see and report the topography of the respective sub-sea earth layers. The resulting information is subsequently stored, processed and pictorially displayed for petrophysical study by geologists and production engineers charged with the task of discovering and managing production of economic minerals.

The plastic hose containing the hydrophones can stretch as much as twice its relaxed length during tow through the water. Therefore seismic cables include stress members to limit the stretch because by stretching, the hydrophones are displaced from their ordained spacings and therefore see a distorted picture of the sub-sea strata. Ideally, one might use steel stress members in the streamer cable. But the streamer cables are designed to be neutrally buoyant in the water. Steel stress members destroy that buoyancy because of their excessive weight. Accordingly, to save weight, the stress members may be ropes made from polyamide or aramid fibers. But the modulus of stretch of those fibers, although far less than that of the plastic hose material used to house the hydrophones, is undesirably large, amounting to several percent.

U.S. Pat. No. 4,312,260 for a Flexible Cable, issued Jan. 26, 1982 to G. Morieras teaches a flexible cable that, according to the abstract, comprises a plurality of substantially parallel textile core threads and an external sheath in which cable cohesion is provided by a binder which is applied in a discontinuous manner to the threads to bond the core threads to one another to form a core. The same or additional binder is used to bond the core to the sheath. An electrical conductor element can be provided centrally of the core and the sheath is preferably braided about the core. In addition to the beneficial properties associated with totally impregnated cables, the cables of this invention provide very high flexibility.

It is to be observed that the individual fibers of the core bundle are impregnated by the binder, but the rope or cable taken a whole is not so impregnated. The stretch characteristics of the cable are not discussed.

There is a need for a process for manufacturing a rope having a preselected effective modulus of stretch.

SUMMARY OF THE INVENTION

This is a process for remanufacturing an elongated rope, spun from a bundle of organic fibers, that is characterized by a preselected effective modulus of stretch. The fibers are impregnated with a plastic compound over a plurality of segments that are distributed at spaced-apart intervals along the length of the rope. The impregnated segments are of a uniform pre-selected length and are separated by uniform-length non-impregnated spaces. The modulus of stretch of each segment is reduced to substantially to zero by curing the plastic compound that impregnates each of the respective segments. The effective modulus of stretch of the rope taken as a whole is adjusted by adjusting am impregnated segment length relative to a unit rope length.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Figure 1:
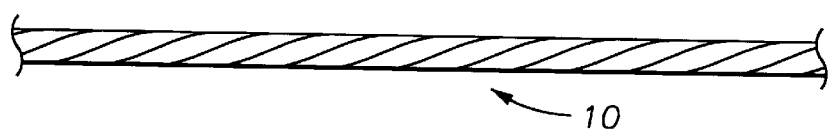
FIG. 1 is a sketch of an off-the-shelf untreated prior-art rope.
Figure 2:
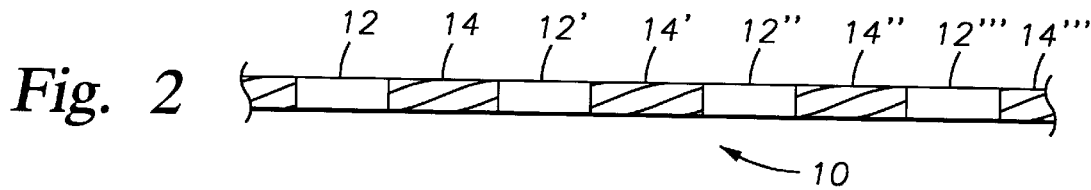
FIG. 2 illustrates the distribution and spacing of impregnated rope segments.

As earlier pointed out, ropes made from organic fibers such as hemp, sisal, or one of the many synthetic fibers such as aramid, generally shown as 10 in FIGS. 1 and 2, are preferred in applications where the great weight of metallic chains or cables is undesirable or prohibitive. The disadvantage of organic-fiber ropes is their modulus of stretch. For example, the PS29-B15 fiber product provided by Philadelphia Resins Corp. of Montgomeryville, Pa., exhibits a 2% stretch at 50% of rated load. For a 5-kilometer streamer cable such as used in seismic exploration, that amount of stretch causes a distortion of 100 meters in the overall end-to-end length of a 5000-meter hydrophone array. The stretch factor of organic-fiber ropes used as anchor hawsers in mooring deep-water drill rigs, can result in disastrous off-station drift.

I have found that conventional organic-fiber ropes can be endowed with a substantially-reduced effective modulus of stretch by a re-manufacturing process next to be described.

With reference to FIG. 2, segments $12^i$, where i is a running index from 1–n, n being the number of segments, of a rope, 10, such as was shown in FIG. 1 as prior art, are impregnated with a plastic material which becomes rigid after curing. A suitable plastic is an epoxy resin such as Scotchcast® 6 or 8 made by 3-M Inc. The segments $12^i$ are distributed along the length of the rope which may be of any desired length and diameter suitable for its intended application. The segments are preferably of a uniform length and are spaced-apart by spaces $14^j$, where j is a running index from 1–m, m being the total number of spaces in the rope; the spaces are also preferably of uniform length. In the drawings, four segments and spaces are shown but many, many more may be used as needed, depending on the rope length. If desired, the rope may be pre-stressed prior to impregnation.

After impregnation, the epoxy resin is cured as recommended by the manufacturer thereof. The act of curing reduces the effective modulus of stretch of an impregnated segment to substantially zero.

Figure 3:
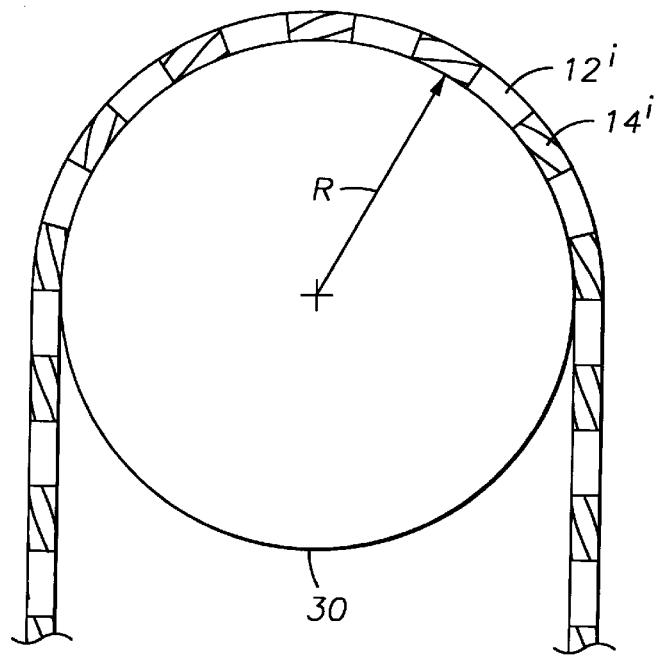
FIG. 3 schematically shows the relation between segment length and the core diameter of a winding drum.

The lengths of the impregnated segments and the lengths of the spaces therebetween are empirically pre-selected as a compromise between the desired effective modulus of stretch and the flexibility required for reeving the re-manufactured rope over the minimum radius of curvature associated with the tackle used for deploying the rope. In effect, the length of the chord subtended by the rigid segment should approach the length of the corresponding circular arc. FIG. 3 is a schematic diagram of a cable drum 30 over which rope 10 is drawn. The segments $12^i$ and segments $14^j$ should be as long as possible yet short enough to comfortably wind over the drum. For a rope 1 cm in diameter, re-manufactured with 5-cm segments and spaces, the minimum drum radius should be no less than about a half meter.

In general, the effective modulus of stretch, M, is the rated stretch, S, scaled by a coefficient equal to the ratio of an impregnated segment length L relative to a unit length of rope, U. Thus, $$M=S(1-L/U).$$

Accordingly, the effective modulus of stretch of a re-manufactured rope, taken as a whole may be reduced to half of the rated modulus of stretch by pre-selecting the length of each segment to be equal to the spacing between segments as shown in FIG. 2. The scale factor is thus the ratio between the length of a segment and a unit rope length. By way of example, if a segment length is 50 cm and if a unit length is taken as 1 meter, the scaling coefficient is 0.50. Other ratios may be selected.

Figure 4:
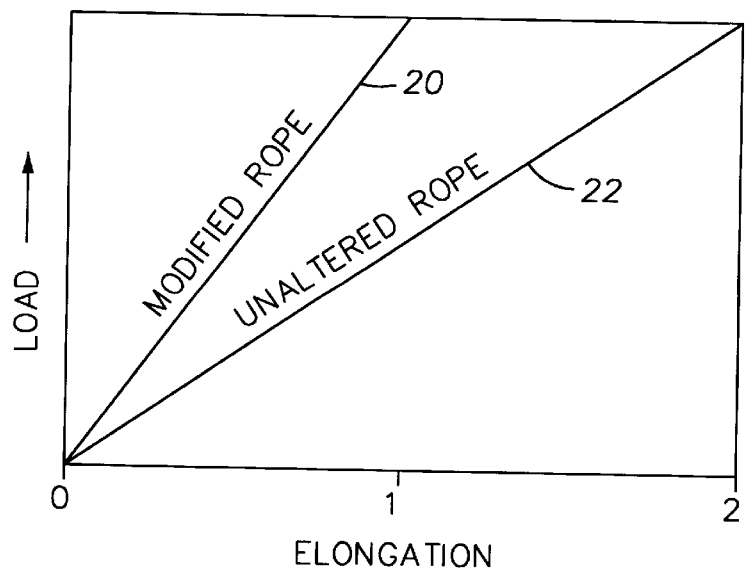
FIG. 4 is a dimensionless graph showing the stretch as a function of load of an unaltered rope as compared to a rope remanufactured in accordance with this invention, for a impregnated/unimpregnated ratio of 0.50.

FIG. 4 illustrates dimensionless graphs 20 and 22 showing respectively, the stress vs. elongation of a rope re-manufactured according to the configuration shown in FIG. 2 and an unaltered rope.

There are many techniques, well known to the injection-molding art, of impregnating the respective segments along the rope. One simple way is to encircle the rope with one or more split molds of suitable length and diameter. Thereafter the required volume of epoxy resin is injected into the mold around the rope. The epoxy resin may be cured by thermo-setting or any other well known means suitable to the particular brand of material used.

The rope may be processed as described during original manufacture or it may more conveniently be subjected to after-market remanufacture, customized to a particular application.

This invention has been described with a certain degree of specificity by way of example but not by way of limitation. Those skilled in the art will devise obvious variations to the examples given herein but which will fall within the scope and spirit of this invention which is limited only by the appended claims.

What is claimed is:

1. A process for treating an elongated rope to adjust its effective modulus of stretch to a pre-selected value, said rope being spun from a bundle of organic fibers and characterized by a rated modulus of stretch, comprising:

impregnating the fibers of said rope with a plastic along a plurality of spaced-apart segments, the segments being distributed along the length of said elongated rope and separated by unimpregnated spaces of substantially uniform length, each said segment having a substantially-uniform pre-selected length;

reducing the effective modulus of stretch of each said impregnated segment substantially to zero by curing the plastic impregnating each said segment;

reducing the effective modulus of stretch of said rope taken as a whole to a pre-selected value by choosing the ratio of the segment length relative to a unit length of said rope.

2. The process as defined by claim 1 wherein the length of the impregnated segments is an empirical function of the radius of curvature of the core of a winding drum with which said elongated cord is to be wound.

3. A rope characterized by rigid segments alternating with flexible spaces, as re-manufactured according to the process of claim 2.

4. The process as defined by claim 1 wherein the length of the impregnated segments is determined empirically as a function of the smallest radius of curvature of the tackle over which said elongated cord is to be reeved.

5. A rope re-manufactured according to the process of claim 3.

6. The process as defined by claim 1 wherein said plastic is an epoxy resin.

7. A process for reducing the modulus of stretch of a stress member for use with a seismic cable, the stress member being spun from a bundle of organic fibers, comprising:

impregnating the fibers of said stress member with an epoxy resin over a plurality of spaced-apart segments distributed along the length of said stress member, each said segment having a first uniform pre-defined length, the spaces between the respective impregnated segments being characterized by a second uniform length;

reducing the effective modulus of stretch of each said segment substantially to zero by curing the epoxy resin following impregnation of each said segment;

reducing the effective modulus of stretch of said stress member in proportion to the ratio between the first uniform pre-defined length of a segment and a unit rope length of said stress member.

* * * * *